(12) United States Patent
Fallahmohammadi et al.

(10) Patent No.: US 11,460,652 B2
(45) Date of Patent: Oct. 4, 2022

(54) OPTICAL-FIBER RIBBON WITH ADHESIVE-FREE GAPS

(71) Applicant: Prysmian S.p.A., Milan (IT)

(72) Inventors: Ehsan Fallahmohammadi, Columbia, SC (US); Clint Nicholaus Anderson, West Columbia, SC (US); Luca Giorgio De Rai, Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 17/130,589

(22) Filed: Dec. 22, 2020

(65) Prior Publication Data

US 2022/0196944 A1    Jun. 23, 2022

(51) Int. Cl.
    *G02B 6/44*    (2006.01)

(52) U.S. Cl.
    CPC ........... *G02B 6/4404* (2013.01); *G02B 6/441* (2013.01); *G02B 6/448* (2013.01)

(58) Field of Classification Search
    CPC ....... G02B 6/4404; G02B 6/441; G02B 6/448
    USPC ....................................................... 385/114
    See application file for complete search history.

(56) References Cited

U.S. PATENT DOCUMENTS

| | | | |
|---|---|---|---|
| 5,682,454 A | 10/1997 | Gaillard | |
| 5,720,908 A | 2/1998 | Gaillard | |
| 5,966,489 A | 10/1999 | Harwell et al. | |
| 6,381,390 B1 | 4/2002 | Hutton et al. | |
| 6,584,257 B1 | 6/2003 | Hurley et al. | |
| 6,853,783 B2 | 2/2005 | Chiasson et al. | |
| 7,623,747 B2 | 11/2009 | de Montmorillon et al. | |
| 7,889,960 B2 | 2/2011 | de Montmorillon et al. | |
| 7,995,889 B2 | 8/2011 | de Montmorillon et al. | |
| 8,131,125 B2 | 3/2012 | de Montmorillon et al. | |
| 8,145,025 B2 | 3/2012 | de Montmorillon et al. | |
| 8,145,027 B2 | 3/2012 | Overton et al. | |
| 8,265,442 B2 | 9/2012 | Overton | |
| 8,385,705 B2 | 2/2013 | Overton et al. | |
| 8,428,414 B2 | 4/2013 | de Montmorillon et al. | |
| 8,467,647 B2 | 6/2013 | Wells et al. | |
| 8,548,294 B2 | 10/2013 | Toge et al. | |
| 8,600,206 B2 | 12/2013 | Overton | |
| 8,837,889 B2 | 9/2014 | de Montmorillon et al. | |

(Continued)

FOREIGN PATENT DOCUMENTS

| | | |
|---|---|---|
| DE | 3502754 A1 | 7/1986 |
| DE | 3914014 A  | 11/1990 |

(Continued)

OTHER PUBLICATIONS

Commonly owned U.S. Appl. No. 17/130,568, filed Dec. 22, 2020, pp. 1-37 [Cited in Specification].

(Continued)

*Primary Examiner* — Jerry M Blevins
(74) *Attorney, Agent, or Firm* — Addition, Pendleton & Witherspoon, P.A.

(57) ABSTRACT

An optical-fiber ribbon includes intermittent gaps along its longitudinal length in which no bonding material is present across the width of the optical-fiber ribbon. These intermittent gaps without bonding material (e.g., adhesive beads) help to reduce or eliminate bonding-material interference as the optical-fiber ribbon is positioned within an alignment chuck during preparations for mass-fusion splicing.

16 Claims, 9 Drawing Sheets

(56) References Cited

U.S. PATENT DOCUMENTS

| | | |
|---|---|---|
| 9,086,555 B2 | 7/2015 | Namazue et al. |
| 9,110,265 B2 | 8/2015 | Wells et al. |
| 9,244,220 B2 | 1/2016 | Overton |
| 9,389,386 B2 | 7/2016 | Matsuzawa et al. |
| 9,541,722 B2 | 1/2017 | Sajima et al. |
| 9,880,368 B2 | 1/2018 | Debban et al. |
| 9,995,896 B2 | 6/2018 | Namazue et al. |
| 10,078,194 B2 | 9/2018 | Sajima et al. |
| 10,185,105 B2 | 1/2019 | Risch et al. |
| 10,185,110 B2 | 1/2019 | Risch et al. |
| 10,782,495 B2 | 9/2020 | Fallahmohammadi et al. |
| 10,884,213 B1 | 1/2021 | Fallahmohammadi et al. |
| 11,169,342 B2 | 11/2021 | Fallahmohammadi et al. |
| 11,256,051 B2 | 2/2022 | Fallahmohammadi et al. |
| 2003/0118301 A1 | 6/2003 | Hurley et al. |
| 2007/0127878 A1 | 6/2007 | de Montmorillon et al. |
| 2009/0175583 A1 | 7/2009 | Overton |
| 2009/0279835 A1 | 11/2009 | de Montmorillon et al. |
| 2009/0279836 A1 | 11/2009 | de Montmorillon et al. |
| 2010/0067859 A1 | 3/2010 | de Montmorillon et al. |
| 2010/0119202 A1 | 5/2010 | Overton |
| 2010/0254658 A1 | 10/2010 | Tankaka et al. |
| 2010/0290781 A1 | 11/2010 | Overton et al. |
| 2011/0058779 A1 | 3/2011 | Wells et al. |
| 2011/0110635 A1 | 5/2011 | Toge et al. |
| 2011/0135264 A1 | 6/2011 | de Montmorillon et al. |
| 2011/0286710 A1 | 11/2011 | de Montmorillon et al. |
| 2012/0183268 A1 | 7/2012 | de Montmorillon et al. |
| 2012/0189258 A1 | 7/2012 | Overton et al. |
| 2013/0084146 A1 | 4/2013 | Speller et al. |
| 2013/0156390 A1 | 6/2013 | Matsuzawa et al. |
| 2013/0279866 A1 | 10/2013 | Wells et al. |
| 2014/0086548 A1 | 3/2014 | Overton |
| 2014/0112631 A1 | 4/2014 | Namazue et al. |
| 2016/0161692 A1 | 6/2016 | Namazue et al. |
| 2016/0299310 A1 | 10/2016 | Kaneko et al. |
| 2016/0356976 A1 | 12/2016 | Sajima et al. |
| 2017/0090135 A1 | 3/2017 | Sato et al. |
| 2017/0115461 A1 | 4/2017 | Namazue et al. |
| 2017/0184803 A1 | 6/2017 | Namazue et al. |
| 2017/0219790 A1 | 8/2017 | Debban et al. |
| 2017/0219792 A1 | 8/2017 | Debban et al. |
| 2018/0031792 A1 | 2/2018 | Risch et al. |
| 2018/0320003 A1 | 11/2018 | Chen |
| 2018/0371298 A1 | 12/2018 | Schmid et al. |
| 2019/0250347 A1* | 8/2019 | Fallahmohammadi ............... G02B 6/441 |
| 2020/0218020 A1 | 7/2020 | Namazue et al. |
| 2020/0271879 A1 | 8/2020 | Fallahmohammadi et al. |
| 2020/0386961 A1 | 12/2020 | Fallahmohammadi et al. |
| 2021/0063664 A1 | 3/2021 | Fallahmohammadi et al. |
| 2021/0141179 A1 | 5/2021 | Fallahmohammadi et al. |

FOREIGN PATENT DOCUMENTS

| | | |
|---|---|---|
| EP | 1043613 A1 | 10/2000 |
| EP | 1089105 A1 | 4/2001 |
| EP | 1143280 A1 | 10/2001 |
| EP | 2770357 A1 | 8/2014 |
| FR | 2693560 A1 | 1/1994 |
| JP | 2003-232972 A | 8/2003 |
| JP | 2003-241041 A | 8/2003 |
| JP | 2010-44336 A | 2/2010 |
| JP | 2011-221199 A | 11/2011 |
| JP | 2012-027129 A | 2/2012 |
| JP | 2012-027130 A | 2/2012 |
| JP | 2012-027131 A | 2/2012 |
| JP | 2012-103341 A | 5/2012 |
| JP | 2012-108331 A | 6/2012 |
| JP | 2014-010439 A | 1/2014 |
| JP | 2014-052519 A | 3/2014 |
| JP | 2015-021734 A | 2/2015 |
| JP | 2015-108756 A | 6/2015 |
| JP | 2016-075746 A | 5/2016 |
| JP | 2017-062431 A | 3/2017 |
| JP | 2017-134360 A | 8/2017 |
| JP | 2017-181513 A | 10/2017 |
| JP | 2020-024257 A | 2/2020 |
| RU | 2619397 C1 | 5/2017 |
| WO | 2012/023508 A1 | 2/2012 |
| WO | 2012/165371 A1 | 12/2012 |
| WO | 2017/175414 A1 | 10/2017 |
| WO | 2019/011417 A1 | 1/2019 |
| WO | 2019/011418 A1 | 1/2019 |
| WO | 2019/137627 A1 | 7/2019 |
| WO | 2019/137628 A1 | 7/2019 |

OTHER PUBLICATIONS

Fujikura Ltd., Product Brochure for "Mass Fusion Splicer 90R12" (2019) https://www,fusionsplicer.fujikura.com, pp. 1-10.

Loctite Technical Data Sheet, "Loctite 3341", www.henkel.com/industrial, Oct. 2005, pp. 1-4.

DSM Product Data Sheet, "Cableite 9D9-287", Mar. 2007, www.dsmdesotech.com, pp. 1-2.

DSM Product Data Sheet, "Cableite 9D9-464", (no date) pp. 1.

DSM Product Data Sheet, "Cableite 9D9-518", Mar. 2007, Elgin, IL, pp. 1-3.

Loctite Technical Data Sheet, "Loctite SI 5240", www.henkel.com/industrial, Jan. 2015, pp. 1-4.

Search Report in counterpart European Application No. 21213420.9 dated Apr. 26, 2022, pp. 1-9.

\* cited by examiner

OPTICAL-FIBER RIBBON WITH ADHESIVE-FREE GAPS

FIELD OF THE INVENTION

The present invention relates to optical-fiber ribbons and methods for producing optical-fiber ribbons.

BACKGROUND

Optical fibers provide advantages over conventional communication lines. As compared with traditional wire-based networks, optical-fiber communication networks can transmit significantly more information at significantly higher speeds. The amount of data transmitted over optical-fiber cables is continuously increasing worldwide. This is especially so in data centers because of the expansion of cloud computing, which requires that data be received and transmitted in limited physical space. As such, there is an increasing demand for high-fiber-count and high-fiber-density optical cables. Moreover, there is persistent desire to reduce construction costs of access cable networks, making the reduction of optical-cable diameter and weight central to the use of existing facilities (e.g., underground ducts) to reduce installation costs. Another practical requirement is the ability to mass-fusion splice optical fibers to shorten the time required for connecting cables. This means that there are several—possibly conflicting—demands, such as decreasing optical-cable diameters, increasing optical-fiber density, and improving optical-cable workability. This is a serious and difficult challenge for optical-cable manufacturers.

To achieve easy workability, optical-fiber ribbons can preferentially be mass-fusion spliced to simultaneously make multiple optical-fiber connections. Conventional optical-fiber ribbons have the disadvantage of rigidity, however, because of the application of a resin layer around the optical-fiber assembly to keep the optical fibers in a parallel plane. This rigidity limits the possibility of increasing fiber density in optical-fiber cables.

It is well known to connect two optical fibers end-to-end by fusion splicing with a laser, electric arc, or the like. The splicing usually includes preparing each optical-fiber's end portion by stripping the coatings (e.g., the outer secondary coating and inner primary coating) from each optical fiber's outer glass cladding and inner glass core, and precisely cleaving each optical fiber's outer glass cladding and inner glass core to yield a bare glass end to be spliced. Typically, the respective cleaved, bare glass ends are precisely aligned in a single-splice, fusion-splicing machine that joins the two optical fibers. The splice alignment and other accommodations help to minimize any attenuation at the splice and provide a strong connection between the spliced ends.

The single-splicing machine typically includes opposite holding mechanisms for respectively holding the optical fibers so that the cleaved, bare glass ends can be precisely aligned. To facilitate alignment, each holding mechanism (e.g., a single-fiber alignment chuck) can include a platform or tray defining a V-shaped groove for precisely retaining each optical fiber's cleaved, bare end portion. Additionally, each alignment chuck or holding mechanism can further include a portion for precisely securing each optical fiber's coated portion adjacent to the cleaved, bare end portion.

Similarly, it is well known to collectively splice two optical-fiber ribbons end-to-end by mass-fusion splicing. Each optical-fiber ribbon, for example, may include twelve optical fibers that are held together by adhesive material. Preparing each optical-fiber ribbon's end portion typically includes separating the constituent optical fibers' respective end portions and then preparing each optical fiber to yield bare glass end portions. For efficiency, the respective cleaved, bare glass ends are precisely aligned in a mass-fusion splicing machine that joins the respective optical fibers.

The mass-fusion splicing machine (e.g., a mass-fusion splicer) typically employs opposite holding mechanisms (e.g., alignment chucks) for respectively securing the optical fibers so that their cleaved, bare glass ends can be precisely aligned. To facilitate alignment, each alignment chuck or other holding mechanism can include a platform or tray respectively defining a plurality of V-shaped grooves (e.g., 12 grooves or 24 grooves) for precisely retaining each optical fiber's cleaved, bare end portion. Additionally, each alignment chuck or other holding mechanism can further include a part or a portion for precisely securing each optical fiber's coated portion adjacent to the cleaved, bare end portion.

Flexible optical-fiber ribbons yield increased optical-fiber density in optical-fiber cables. Mass splicing such flexible optical-fiber ribbons requires positioning the optical-fiber ribbons in alignment chucks of a mass-fusion splicing machine, but sometimes the adhesive bonds (e.g., elongated beads) may cause interference within the alignment chucks (e.g., the V-shaped grooves in the alignment chuck). For example, some commercially available alignment chucks (e.g., used in mass-fusion splicing machines) cannot readily accommodate flexible optical-fiber ribbons if the pitch of the adhesive-bead pattern is too short (e.g., less than about 100 millimeters), because of adhesive-bead interference in the alignment chucks' V-shaped grooves. Alternatively, if the pitch of the adhesive-bead pattern becomes too long, flexible optical-fiber ribbons can become very flexible and difficult to load into the alignment chucks. A solution requires applying tension to both ends of the optical-fiber ribbon and positioning the edge of the optical fiber at either end of the alignment chuck to achieve proper loading of the optical-fiber ribbon into the alignment chuck.

SUMMARY

It is an exemplary object of the present invention to provide an optical-fiber ribbon having excellent flexibility, strength, and robustness to facilitate rolling or folding of the constituent optical fibers in the ribbon-width direction. It is another exemplary object of the present invention to provide an optical-fiber ribbon that can be readily mass-fusion spliced to make multiple optical-fiber connections.

In one aspect, the present invention embraces an optical-fiber ribbon that facilitates mass-fusion splicing via a mass-fusion splicing machine. An exemplary optical-fiber ribbon includes intermittent or recurrent gaps along its longitudinal length in which substantially no bonding material is present across the width of the optical-fiber ribbon. These intermittent gaps without bonding material (e.g., adhesive-free gaps, areas, zones, or portions) help to reduce or eliminate bonding-material interference as the optical-fiber ribbon is positioned within an alignment chuck, which is used to secure an optical-fiber ribbon in during preparations for mass-fusion splicing.

An exemplary optical-fiber ribbon includes a plurality n of respectively adjacent optical fibers (e.g., twelve or more optical fibers, such as 250-micron optical fibers or 200-micron optical fibers) extending in a longitudinal direction and arranged in parallel to form an optical-fiber assembly having a width w extending crosswise to a longitudinal length of the optical-fiber assembly. The optical-fiber ribbon further includes bonding material on the optical-fiber assembly (e.g., deposited as an adhesive bead on a major surface of the optical-fiber assembly, such as its upper planar surface) adhesively bonding adjacent optical fibers in the optical-fiber assembly, the bonding material repeatedly forming alternating first and second bonding-material patterns across the optical-fiber assembly for a portion of its longitudinal length, wherein, in the same direction along the longitudinal length of the optical-fiber assembly: (i) the first bonding-material patterns extend across the optical-fiber assembly from a first outermost optical fiber in the optical-fiber assembly to an opposite second outermost optical fiber in the optical-fiber assembly, and the second bonding-material patterns extend across the optical-fiber assembly from the second outermost optical fiber in the optical-fiber assembly to the opposite first outermost optical fiber in the optical-fiber assembly; (ii) the alternating first and second bonding-material patterns have respective mean lengths $l_1$ and $l_2$ as measured along the longitudinal length of the optical-fiber assembly; and (iii) the alternating first and second bonding-material patterns achieve recurring adhesive-free gaps in which no bonding material is present across the width w of the optical-fiber assembly for a portion of its longitudinal length, the adhesive-free gaps having a minimum length g as measured along the longitudinal length of the optical-fiber assembly, wherein $g \geq 8 \times (l_1 \div n)$ if $l_1 \leq l_2$ and $g \geq 8 \times (l_2 \div n)$ if $l_2 \leq l_1$.

Exemplary optical-fiber ribbons have excellent flexibility, strength, and robustness to facilitate rolling or folding of the constituent optical fibers in the ribbon-width direction. In addition, exemplary optical-fiber ribbons can be mass-fusion spliced to make multiple optical-fiber connections, and individual optical fibers can be separated without damaging adjacent optical fibers. Each optical fiber typically includes, from its center to its periphery, a glass core, a glass cladding, and one or more coatings (e.g., a primary coating, a secondary coating, and an optional ink layer). As such, corresponding embodiments of the optical-fiber ribbon herein disclosed are applicable to the related method for making an optical-fiber ribbon, and vice versa.

The foregoing illustrative summary, other objectives and/or advantages of the present disclosure, and the manner in which the same are accomplished are further explained within the following detailed description and its accompanying drawings.

BRIEF DESCRIPTION OF THE DRAWINGS

The present invention is described hereinafter with reference to the accompanying drawings in which embodiments of the present invention are shown and in which like reference numbers indicate the same or similar elements. The drawings are provided as examples, may be schematic, and may not be drawn to scale. The present inventive aspects may be embodied in many different forms and should not be construed as limited to the examples depicted in the drawings.

DETAILED DESCRIPTION

Figure 1:
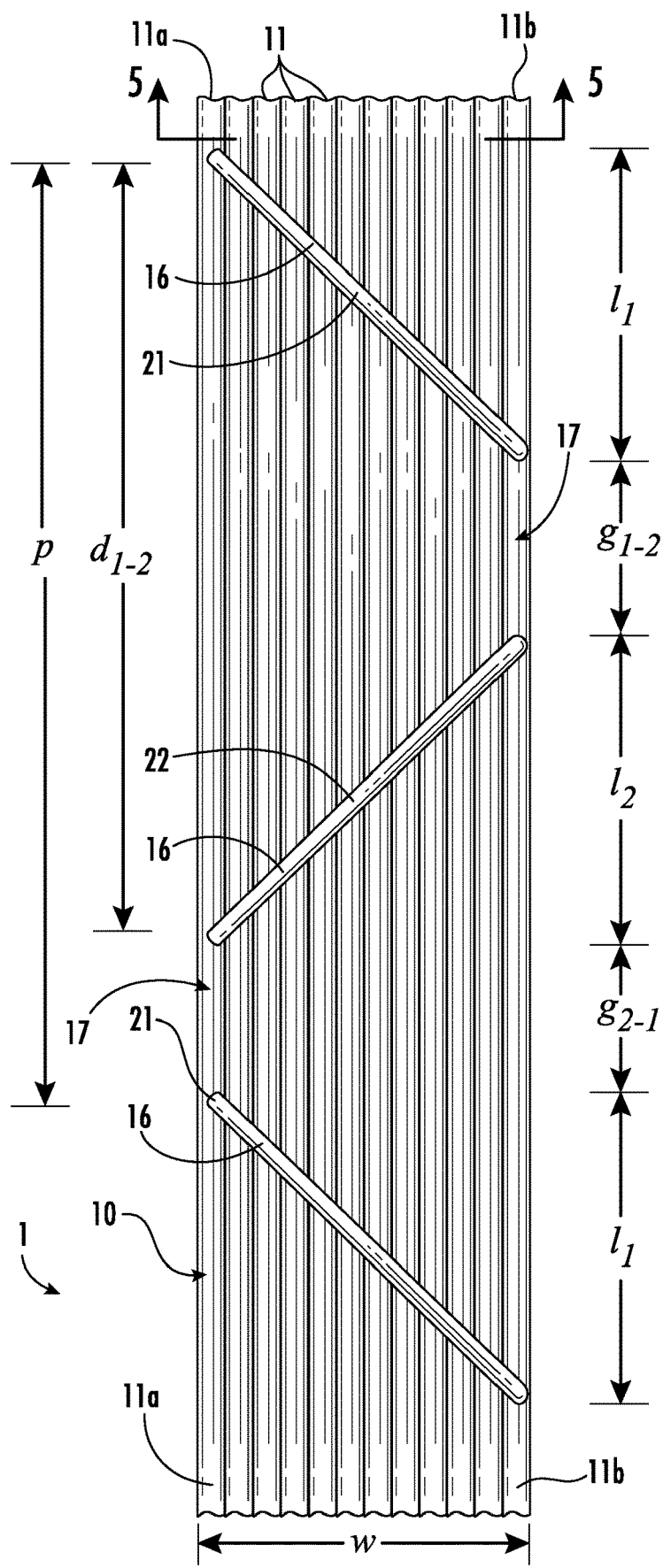
FIG. 1 is a top plan view of a section of an exemplary optical-fiber ribbon in accordance with a first embodiment of this disclosure.

Various aspects and features are herein described with reference to the accompanying figures. Details are set forth to provide a thorough understanding of the present disclosure. It will be apparent, however, to those having ordinary skill in the art that the disclosed optical-fiber ribbons and methods for producing optical-fiber ribbons may be practiced or performed without some or all of these specific details. As another example, features disclosed as part of one embodiment can be used in another embodiment to yield a further embodiment. Sometimes well-known aspects are not described in detail to avoid unnecessarily obscuring the present disclosure. This detailed description is thus not to be taken in a limiting sense, and it is intended that other embodiments are within the spirit and scope of the present disclosure.

As depicted in FIGS. 1-4, an exemplary optical-fiber ribbon 1 includes a plurality n of respectively adjacent optical fibers 11 (e.g., 12, 24, or 36 optical fibers, such as 250-micron optical fibers or 200-micron optical fibers) extending in a longitudinal direction and arranged in parallel to form an optical-fiber assembly 10, which has a width w extending crosswise to a longitudinal length of the optical-fiber assembly 10. The optical-fiber ribbon 1 further includes bonding material 16 on the optical-fiber assembly 10 (e.g., deposited as adhesive beads on a major surface of the optical-fiber assembly 10, such as its upper planar surface) adhesively bonding adjacent optical fibers 11 in the optical-fiber assembly 10, the bonding material 16 repeatedly forming alternating first and second bonding-material patterns 21, 22 across the optical-fiber assembly 10 for a portion of its longitudinal length, wherein, in the same direction along the longitudinal length of the optical-fiber assembly 10: (i) the first bonding-material patterns 21 extend across the optical-fiber assembly 10 from a first outermost optical fiber 11a in the optical-fiber assembly 10 to an opposite second outermost optical fiber 11b in the optical-fiber assembly 10, and the second bonding-material patterns 22 extend across the optical-fiber assembly 10 from the second outermost optical fiber 11b in the optical-fiber assembly to the opposite first outermost optical fiber 11a in the optical-fiber assembly; (ii) the alternating first and second bonding-material patterns 21, 22 have respective mean lengths $l_1$ and $l_2$ as measured along the longitudinal length of the optical-fiber assembly 10; and (iii) the alternating first and second bonding-material patterns 21, 22 achieve recurring adhesive-free gaps 17 in which no bonding material 16 is present across the width w of the optical-fiber assembly 10 for a portion of its longitudinal length, the adhesive-free gaps 17 having a minimum length g as measured along the longitudinal length of the optical-fiber assembly, wherein $g \geq 8 \times (l_1 \div n)$ if $l_1 \leq l_2$ and $g \geq 8 \times (l_2 \div n)$ if $l_2 \geq l_1$. Typically, each of the first bonding-material patterns 21 has essentially the same length $l_1$, and each of the second bonding-material patterns 22 has essentially the same length $l_2$, too (e.g., the first and second bonding-material patterns 21, 22 each exhibit regular patterns).

Figure 5:
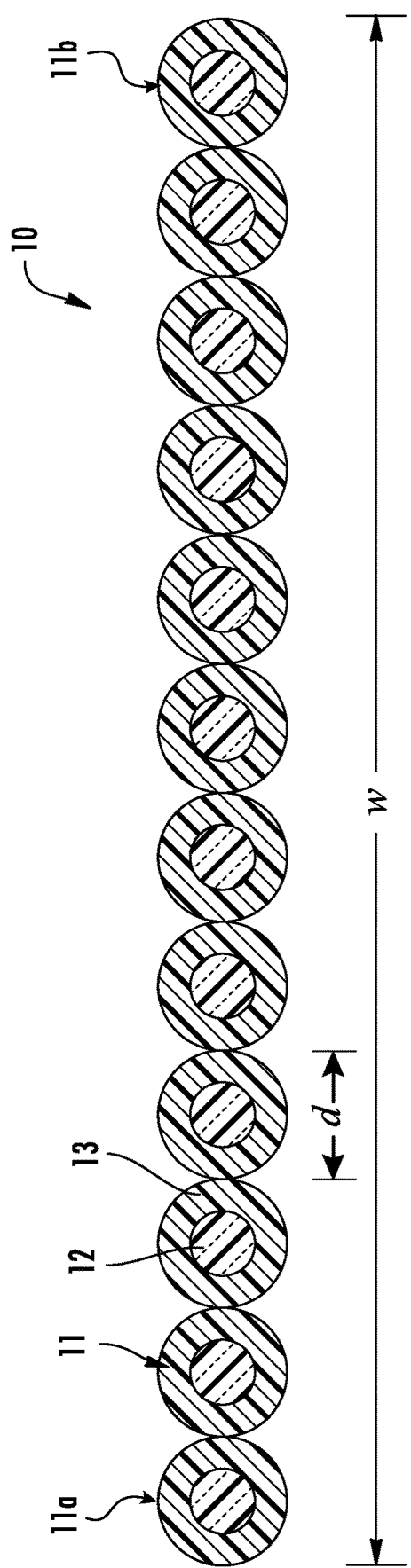
FIG. 5 is a cross-sectional view representative of cross sections taken along line 5-5 of each of FIGS. 1-4.

As depicted in FIG. 5, an exemplary optical-fiber assembly 10 includes a plurality of optical fibers 11 arranged side-by-side such that the optical fibers 11 are substantially parallel to one another (e.g., aligned within the optical-fiber assembly 10). Each optical fiber 11 may be closely spaced or contiguous with an adjacent optical fiber 11 but typically should not cross over one another along the length of the optical-fiber assembly 10. Optical fibers 11 usually include a component glass fiber 12 and one or more surrounding coating layers 13. See FIG. 5. Those having ordinary skill in the art will understand the various kinds of primary coatings, secondary coatings, and ink layers, as well as the structures and thicknesses thereof. This application hereby incorporates by reference commonly owned U.S. Pat. No. 8,265,442 for a Microbend-Resistant Optical Fiber and U.S. Pat. No. 8,600,206 for a Reduced-Diameter Optical Fiber.

The optical-fiber assembly 10 (and the resulting optical-fiber ribbon 1) have a substantially planar (i.e., flattened) geometry that defines a relatively narrow height, a relatively wide width, and a substantially continuous length (e.g., over 1,000 meters, such as 5,000 meters or more). As used herein, an optical-fiber assembly 10 as depicted in FIG. 5 inherently defines an upper side (i.e., the top), a lower side (i.e., the bottom), a left edge, and a right edge. The respective upper and lower sides define the major surfaces of the optical-fiber assembly 10 (and the resulting optical-fiber ribbon 1, such as shown in FIG. 1-4). Those having ordinary skill in the art will appreciate that flipping the optical-fiber assembly 180 degrees over its major transverse axis will reverse the top and bottom, and so the terms can be used interchangeably herein depending on the frame of reference. Similarly, those having ordinary skill in the art will appreciate that yaw rotating the optical-fiber assembly 180 degrees will reverse the right edge and left edge, and so the terms can be used interchangeably herein depending on the frame of reference. Accordingly, as used herein, terms such as "first side" and "second, opposite side" refer to the respective upper and lower sides of the optical-fiber assembly 10 (and the resulting optical-fiber ribbon), or vice versa depending on the frame of reference.

As shown in FIG. 5, the optical fibers 11 are arranged in parallel and respectively adjacent to each other in a plane. As such, the nominal width w of the optical-fiber assembly 10 reflects the number n and diameter d of the optical fibers (i.e., $w \approx n \times d$). Typically, each optical fiber has a substantially circular cross section, and all the optical fibers in an optical-fiber ribbon have substantially the same nominal diameter. In an exemplary embodiment, the width w of the optical-fiber assembly is between about 2 millimeters and 10 millimeters (e.g., between 2 millimeters and 6 millimeters). In practice, the optical fibers are substantially contiguous to one another, although some small gaps may exist between adjacent optical fibers. The width of the resulting optical-fiber ribbon corresponds to the width w of the optical-fiber assembly. See FIG. 5.

In an exemplary embodiment, each optical fiber has a diameter d of between 240 microns and 260 microns, more typically about 250 microns. Alternatively, the optical fibers may have a reduced diameter d, such as between about 180 microns and 230 microns. In an exemplary embodiment, the optical-fiber assembly includes between six and 36 optical fibers (including 6 and 36), such as between twelve and 24 optical fibers (including 12 and 24). For example, an exemplary optical-fiber ribbon formed of twelve (12) 250-micron optical fibers yields a nominal width w of 3000 microns (i.e., 3 millimeters). Similarly, an exemplary optical-fiber ribbon formed of twelve (12) 200-micron reduced-diameter optical fibers yields a nominal width w of 2400 microns (i.e., 2.4 millimeters), and an exemplary optical-fiber ribbon formed of twelve (12) 180-micron reduced-diameter optical fibers yields a nominal width w of 2160 microns (i.e., 2.16 millimeters). Accordingly, those having ordinary skill in the art will appreciate that, with respect to optical-fiber ribbon 1 and the optical-fiber assembly 10, the figures schematically exaggerate the width relative to length, such as to illustrate the characteristics of the first and second bonding-material patterns 21, 22.

Typically, along the optical-fiber assembly 10 for a portion of its longitudinal length, each first bonding-material pattern 21 immediately follows a second bonding-material pattern 22, and each second bonding-material pattern 22 immediately follows a first bonding-material pattern 21. See FIGS. 1-4. In this regard, pitch p is the length of the recurring pattern of bonding material (e.g., deposited adhesive beads) as applied to an optical-fiber assembly (e.g., the repeating length of the alternating first and second bonding-material patterns 21, 22). In contrast, the mean length $l_1$ of the first bonding-material patterns 21 and the mean length of the $l_2$ of the second bonding-material patterns 22 reflect longitudinal distances covered by arrangements of bonding material (e.g., an adhesive bead or beads) from the first outermost optical fiber 11a to the second outermost optical fiber 11b, or vice-versa (e.g., across one width w of the optical-fiber assembly). See FIGS. 1-4. Exemplary optical-fiber ribbons have a pitch p between about 10w and 150w as normalized to the width w of the optical-fiber ribbon 1 (e.g., about 15w-100w, such as about 20w-80w or 25w-60w).

In typical embodiments of the optical-fiber ribbon, the alternating first and second bonding-material patterns 21, 22 have about the same respective mean lengths $l_1$ and $l_2$ as measured along the longitudinal length of the optical-fiber assembly 10 (e.g., $l_1 \approx l_2$). In some embodiments, the mean length $l_1$ of the first bonding-material patterns 21 is inclusively between 90 percent and 100 percent of the mean length of the $l_2$ of the second bonding-material patterns 22, or the mean length $l_2$ of the second bonding-material patterns 22 is inclusively between 90 percent and 100 percent of the mean length $l_1$ of the first bonding-material patterns 21.

In other embodiments of the optical-fiber ribbon, the alternating first and second bonding-material patterns 21, 22 have different mean lengths $l_1$ and $l_2$ as measured along the longitudinal length of the optical-fiber assembly 10. In some embodiments, the mean length $l_1$ of the first bonding-material patterns is between 10 percent and 95 percent of the mean length $l_2$ of the second bonding-material patterns, or the mean length $l_2$ of the second bonding-material patterns is between 10 percent and 95 percent of the mean length $l_1$ of the first bonding-material patterns.

In another exemplary optical-fiber ribbon 1, the alternating first and second bonding-material patterns 21, 22 achieve recurring adhesive-free gaps 17 in which no bonding material 16 is present across the width w of the optical-fiber assembly 10 for a portion of its longitudinal length, the adhesive-free gaps 17 having a minimum length g as measured along the longitudinal length of the optical-fiber assembly 10, wherein $g \geq 10 \times (l_1 \div n)$ if $l_1 \leq l_2$ and $g \geq 10 \times (l_2 \div n)$ if $l_2 \leq l_1$.

In yet another exemplary optical-fiber ribbon 1, the alternating first and second bonding-material patterns 21, 22 achieve recurring adhesive-free gaps 17 in which no bonding material 16 is present across the width w of the optical-fiber assembly 10 for a portion of its longitudinal length, the adhesive-free gaps 17 having a minimum length g as measured along the longitudinal length of the optical-fiber assembly 10, wherein $g \geq 12 \times (l_1 \div n)$ if $l_1 \leq l_2$ and $g \geq 12 \times (l_2 \div n)$ if $l_2 \leq l_1$.

In yet another exemplary optical-fiber ribbon 1, the alternating first and second bonding-material patterns 21, 22 achieve recurring adhesive-free gaps 17 in which no bonding material 16 is present across the width w of the optical-fiber assembly 10 for a portion of its longitudinal length, the adhesive-free gaps 17 having a minimum length g as measured along the longitudinal length of the optical-fiber assembly 10, wherein $g \geq 16 \times (l_1 \div n)$ if $l_1 \leq l_2$ and $g \geq 16 \times (l_2 \div n)$ if $l_2 \leq l_1$.

In yet another exemplary optical-fiber ribbon 1, the alternating first and second bonding-material patterns 21, 22 achieve recurring adhesive-free gaps 17 in which no bonding material 16 is present across the width w of the optical-fiber assembly 10 for a portion of its longitudinal length, the adhesive-free gaps 17 having a minimum length g as measured along the longitudinal length of the optical-fiber assembly 10, wherein $g \geq 24 \times (l_1 \div n)$ if $l_1 \leq l_2$ and $g \geq 24 \times (l_2 \div n)$ if $l_2 \leq l_1$.

In yet another exemplary optical-fiber ribbon 1, the optical-fiber assembly 10 includes at least four adjacent optical fibers 11 extending in a longitudinal direction and arranged in parallel (i.e., $n \geq 4$), and the alternating first and second bonding-material patterns 21, 22 achieve recurring adhesive-free gaps 17 in which no bonding material 16 is present across the width w of the optical-fiber assembly 10 for a portion of its longitudinal length, the adhesive-free gaps 17 having a minimum length g as measured along the longitudinal length of the optical-fiber assembly 10, wherein $g \geq 2 \times l_1$ if $l_1 \leq l_2$ and $g \geq 2 \times l_2$ if $l_2 \leq l_1$.

In yet another exemplary optical-fiber ribbon 1, the optical-fiber assembly 10 includes at least six adjacent optical fibers 11 extending in a longitudinal direction and arranged in parallel (i.e., $n \geq 6$), and the alternating first and second bonding-material patterns 21, 22 achieve recurring adhesive-free gaps 17 in which no bonding material 16 is present across the width w of the optical-fiber assembly 10 for a portion of its longitudinal length, the adhesive-free gaps 17 having a minimum length g as measured along the longitudinal length of the optical-fiber assembly 10, wherein $g \geq (l_1 + l_2)$, such as $g \geq (l_1 + l_2)$.

In yet another exemplary optical-fiber ribbon 1, the alternating first and second bonding-material patterns 21, 22 achieve recurring adhesive-free gaps 17 in which no bonding material 16 is present across the width w of the optical-fiber assembly 10 for a portion of its longitudinal length, the adhesive-free gaps 17 having a minimum length g as measured along the longitudinal length of the optical-fiber assembly 10, wherein $g \geq (l_1 + l_2) \times (n \div (n-2))$, such as wherein $g \geq (l_1 + l_2) \times (n \div (n-2))$. All things being equal, the adhesive-free gaps 17 between successive first and second bonding-material patterns 21, 22 ought to be somewhat greater if the respective patterns extend across the optical-fiber assembly 10 a lateral distance less than the optical-fiber assembly's full width w, such as to the respective interfaces of each outermost optical fiber 11a, 11b and its respective adjacent optical fiber (e.g., w−2d).

In yet another exemplary optical-fiber ribbon 1, in the same direction along the longitudinal length of the optical-fiber assembly 10, the minimum length g of the adhesive-free gaps 17 is a first adhesive-free gap distance $g = g_{1-2}$ between adjacent, spaced ends of successive first and second bonding-material patterns 21, 22, whereby $g = g_{1-2}$, wherein both the adjacent end of the first bonding-material pattern 21 and the adjacent end of the second bonding-material pattern 22 are located along the second outermost optical fiber 11b in the optical-fiber assembly 10, wherein $g_{1-2} \geq 8 \times ((l_1 + l_2) \div 2n)$ as measured along the longitudinal length of the optical-fiber assembly 10. (This exemplary embodiment bases the minimum length g on the average of the mean lengths $l_1$ and $l_2$ of the first and second bonding-material patterns, 21, 22.) FIG. 1 similarly depicts a second adhesive-free gap distance $g_{2-1}$ between adjacent, spaced ends of successive second and first bonding-material patterns 22, 21, wherein both the adjacent end of the second bonding-material pattern 22 and the adjacent end of the first bonding-material pattern 21 are located along the first outermost optical fiber 11a in the optical-fiber assembly 10. In a related embodiment, in the same direction along the longitudinal length of the optical-fiber assembly 10, the successive first and second bonding-material patterns 21, 22 have opposite, adjacent ends located along the first outermost optical fiber 11a in the optical-fiber assembly 10 and are spaced apart by a separation distance $d_{1-2}$, wherein $d_{1-2} \approx g_{1-2} + l_1 + l_2$ as measured along the longitudinal length of the optical-fiber assembly.

Figure 2:
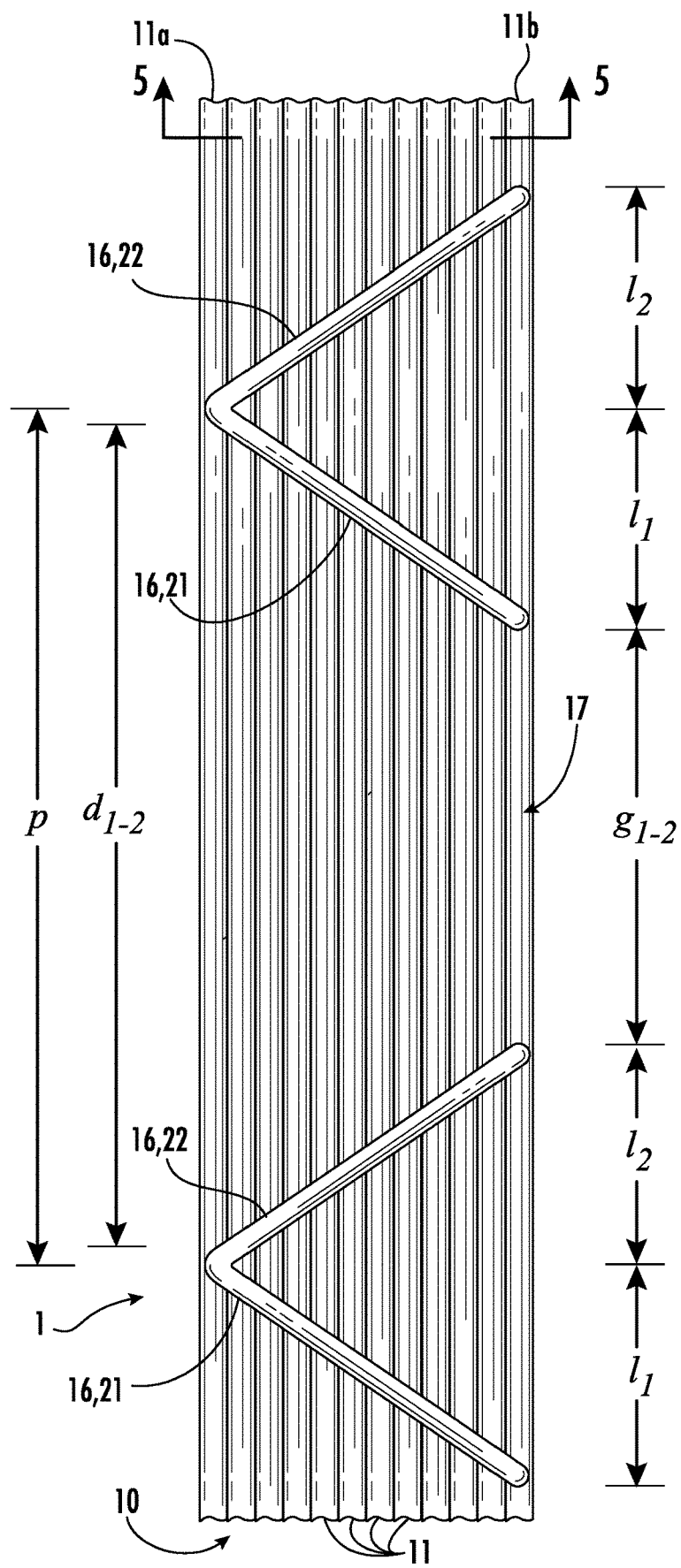
FIG. 2 is a top plan view of a section of an exemplary optical-fiber ribbon in accordance with a second embodiment of this disclosure.

As illustrated in FIGS. 1-2, the area between first and second bonding-material patterns sometimes defines a trapezoidal adhesive-free area 17 having a short base $g_{1-2}$ (e.g., a first adhesive-free gap distance) along the second outermost optical fiber 11b in the optical-fiber assembly 10 and a long base $d_{1-2}$ (e.g., a separation distance) located along the first outermost optical fiber 11a in the optical-fiber assembly 10. With respect to the bonding patterns depicted in FIG. 1, the separation distance $d_{1-2}$ is noticeably shorter than the pitch p (e.g., the repeating length of the alternating first and second bonding-material patterns 21, 22). In contrast, with respect to the bonding patterns depicted in FIG. 2, the separation distance $d_{1-2}$ is nearly the pitch p (e.g., the repeating length of the alternating first and second bonding-material patterns 21, 22), such that $d_{1-2} \approx p$.

By way on non-limiting example with respect to representative 12-optical-fiber ribbons, exemplary adhesive-free gaps have a minimum length g (as measured along the longitudinal length of the optical-fiber assembly) of at least 15 millimeters, such as at least 20 millimeters to accommodate conventional alignment chucks. Typically, exemplary adhesive-free gaps have a minimum length g between about 25 millimeters and 150 millimeters, such as between about 30 millimeters and 100 millimeters (e.g., 35-75 millimeters, such as about 50 millimeters).

With reference to FIG. 1, an exemplary trapezoidal adhesive-free area 17 might have a short base $g_{1-2}$ (e.g., a first adhesive-free gap distance) of between about 15 millimeters and 50 millimeters (e.g., about 20-25 millimeters) and a long base $d_{1-2}$ (e.g., a separation distance) of between about 20 millimeters and 200 millimeters, such as between about 50 millimeters and 150 millimeters (e.g., about 70-100 millimeters). In other embodiments, the separation distance $d_{1-2}$ might exceed 150 millimeters, such as 200 millimeters to 300 millimeters (e.g., about 250 millimeters).

With reference to FIG. 2, an exemplary trapezoidal adhesive-free area 17 might have a short base $g_{1-2}$ (e.g., a first adhesive-free gap distance) of between about 40 millimeters and 100 millimeters (e.g., about 50-60 millimeters) and a long base $d_{1-2}$ (e.g., a separation distance) of between about 80 millimeters and 200 millimeters (e.g., about 100-125 millimeters). Here, the long base $d_{1-2}$ (e.g., a separation distance) is approximately the pitch p (e.g., the repeating length of the alternating first and second bonding-material patterns 21, 22). In other embodiments, the separation distance $d_{1-2}$ might exceed 200 millimeters, such as 250 millimeters to 400 millimeters (e.g., about 300 millimeters).

FIGS. 1-4 depict exemplary optical-fiber ribbons, such as can be formed from an exemplary optical-fiber assembly 10 as depicted in FIG. 5, further including bonding material 16 repeatedly forming alternating first and second bonding-material patterns 21,22 across the optical-fiber assembly 10 for a portion of its longitudinal length (e.g., between the optical-fiber assembly's outermost optical fibers to adhesively bond corresponding adjacent optical fibers).

In an exemplary optical-fiber ribbon, along a longitudinal portion of the optical-fiber assembly 10, each of the first bonding-material patterns 21 respectively comprises a continuous bead of bonding material 16 (e.g., respective continuous adhesive beads between the first outermost optical fiber 11a and the second outermost optical fiber 11b such as depicted in FIGS. 1-2). Similarly, in an exemplary optical-fiber ribbon, along a longitudinal portion of the optical-fiber assembly 10, each of the second bonding-material patterns 22 respectively comprises a continuous bead of bonding material 16 (e.g., respective continuous adhesive beads between the second outermost optical fiber 11b and the first outermost optical fiber 11a such as partially depicted in FIGS. 1-2). In another exemplary embodiment, for the same portion of the optical-fiber assembly's longitudinal length, the alternating first and second bonding-material patterns that achieve recurring adhesive-free gaps having a minimum length g in which no bonding material is present across the width w of the optical-fiber assembly each respectively include only (e.g., consists of or consists essentially of) a continuous bead of bonding material. See FIGS. 1-2.

Figure 3:
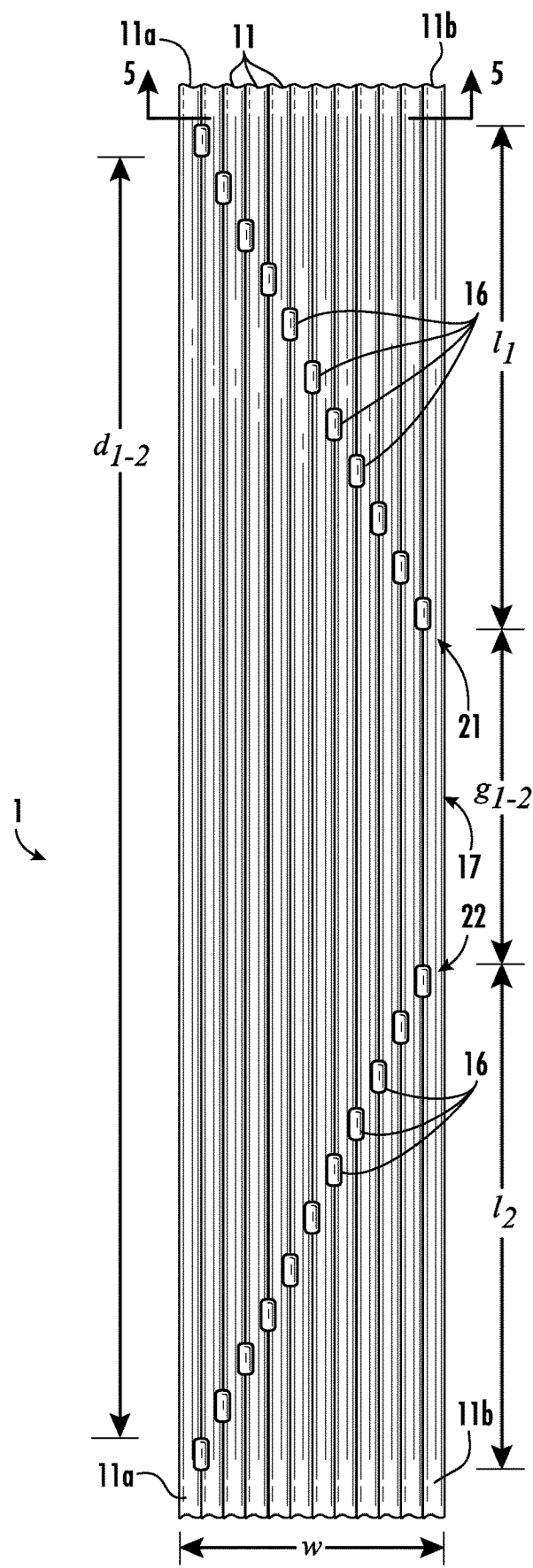
FIG. 3 is a top plan view of a section of an exemplary optical-fiber ribbon in accordance with a third embodiment of this disclosure.
Figure 4:
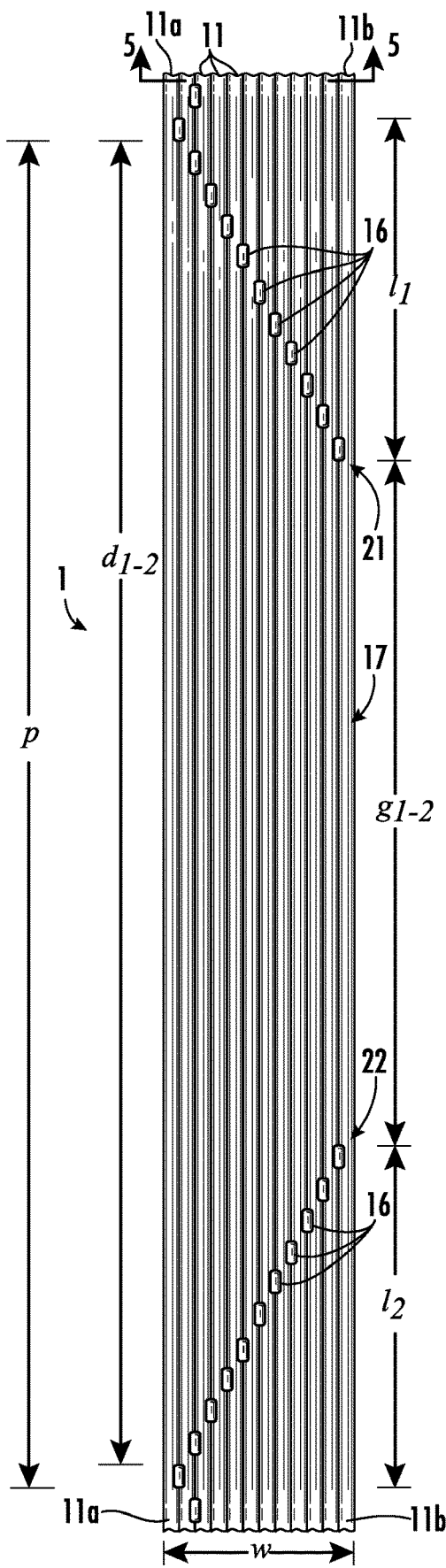
FIG. 4 is a top plan view of a section of an exemplary optical-fiber ribbon in accordance with a fourth embodiment of this disclosure.

In another exemplary optical-fiber ribbon, along a longitudinal portion of the optical-fiber assembly 10, each of the first bonding-material patterns 21 respectively comprises a plurality of successive elongated rectilinear beads 16 arranged lengthwise along the optical-fiber assembly 10, wherein the beads 16 are configured to form elongated bonds between adjacent optical fibers 11 in the optical-fiber assembly 10 (e.g., an arrangement of rectilinear adhesive beads between the first outermost optical fiber 11a and the second outermost optical fiber 11b such as depicted in FIGS. 3-4). Similarly, in an exemplary optical-fiber ribbon, along a longitudinal portion of the optical-fiber assembly 10, each of the second bonding-material patterns 22 respectively comprises a plurality of successive elongated rectilinear beads 16 arranged lengthwise along the optical-fiber assembly 10, wherein the beads 16 are configured to form elongated bonds between adjacent optical fibers 11 in the optical-fiber assembly 10 (e.g., an arrangement of rectilinear adhesive beads between the second outermost optical fiber 11b and the first outermost optical fiber 11a such as depicted in FIGS. 3-4). In another exemplary embodiment, for the same portion of the optical-fiber assembly's longitudinal length, the alternating first and second bonding-material patterns that achieve recurring adhesive-free gaps having a minimum length g in which no bonding material is present across the width w of the optical-fiber assembly each respectively include only (e.g., consists of or consists essentially of) a plurality of successive elongated rectilinear beads arranged lengthwise along the optical-fiber assembly, wherein the beads are configured to form elongated bonds between adjacent optical fibers in the optical-fiber assembly. See FIGS. 3-4.

During manufacturing, the bonding material may be applied to the optical-fiber assembly as a continuous bead or as discontinuous beads, such as disclosed in commonly assigned U.S. Pat. No. 10,782,495, which is hereby incorporated by reference in its entirety. As noted, for example, along a portion of the optical-fiber assembly's longitudinal length, the bonding material may be applied as a plurality of successive rectilinear beads arranged lengthwise along the optical-fiber assembly (e.g., the successive beads forming a stepwise pattern across the optical-fiber assembly), so that the adhesive beads are configured to form elongated bonds between adjacent optical fibers in the optical-fiber assembly.

An exemplary method for applying either a continuous bead of bonding material or discontinuous beads of bonding material to an optical-fiber assembly in a way that facilitates faster line speeds during the manufacturing of optical-fiber ribbons is disclosed in commonly assigned U.S. patent application Ser. No. 16/683,827 for an Optical-Fiber Ribbon with Distorted Sinusoidal Adhesive Pattern and Method Therefor, now U.S. Pat. No. 10,884,213, each of which is hereby incorporated by reference in its entirety.

Figure 6:
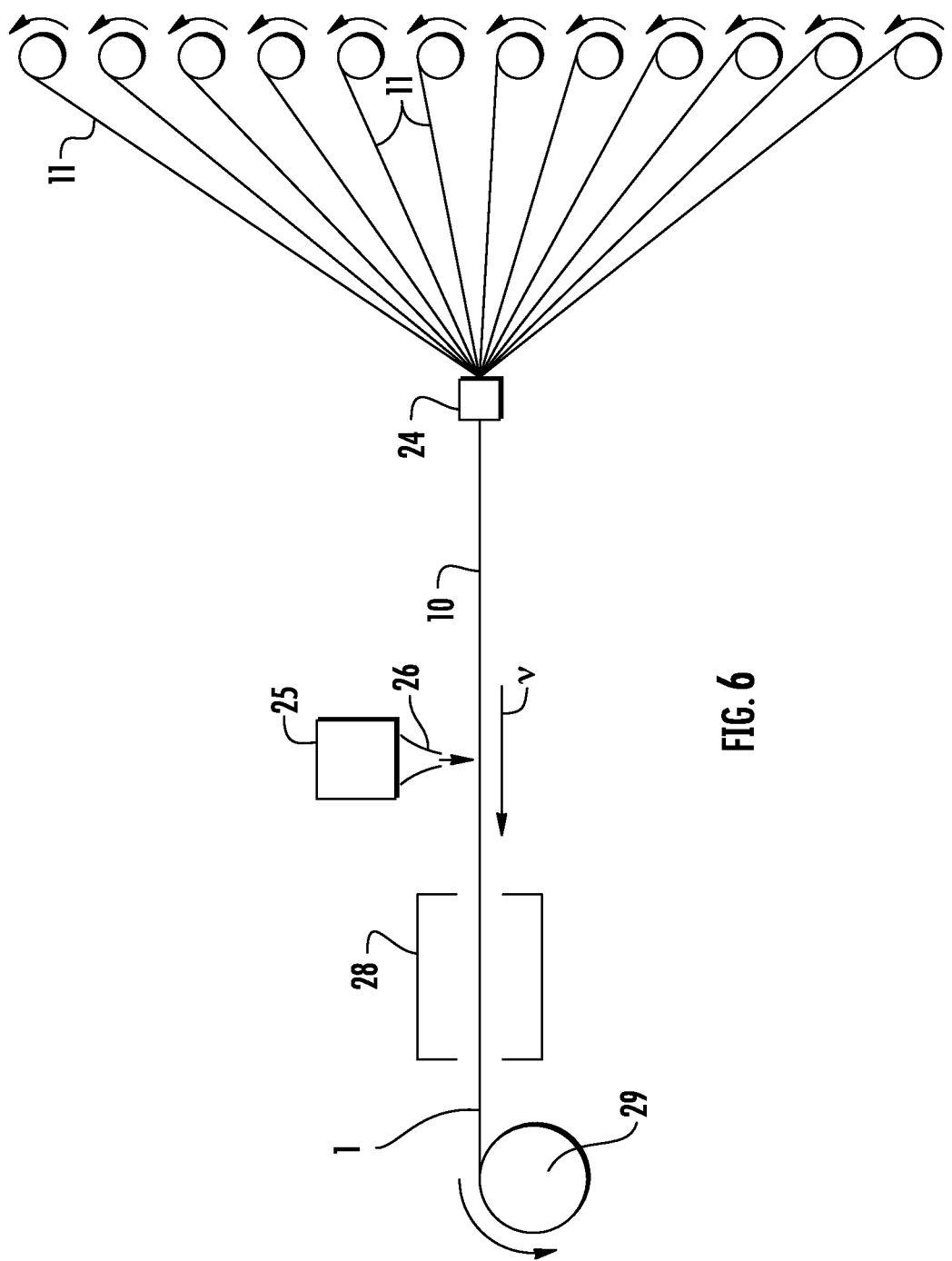
FIG. 6 is a side elevation view depicting an exemplary method of making an optical-fiber ribbon in accordance with an embodiment of this disclosure.

In another aspect, the invention embraces a method of producing an optical-fiber ribbon. As shown in the process schematic depicted in FIG. 6 (processing from right to left), a plurality n of optical fibers 11 (e.g., 12 or 24 reduced-diameter optical fibers) are arranged into a longitudinal optical-fiber assembly 10 having a width w extending crosswise to a longitudinal length of the optical-fiber assembly. For example, a plurality of optical fibers 11 are introduced (e.g., fed into a die 24) to provide a longitudinal optical-fiber assembly 10 in which the plurality of optical fibers 11 are substantially parallel and respectively adjacent to each other. Typically, the longitudinal optical-fiber assembly 10 is a loose arrangement of substantially parallel optical fibers with no bonding between the optical fibers and having interstices or grooves between adjacent optical fibers. When employing an aggregating die 24 to align the optical fibers, the entry speed of the loose optical fibers is the same as the exit speed of the longitudinal optical-fiber assembly.

During processing, the longitudinal optical-fiber assembly 10 advances at linear velocity v, typically at a linear speed greater than 150 meters per minute (e.g., greater than 200 meters per minute, such as greater than 300 meters per minute). In some exemplary embodiments, the longitudinal optical-fiber assembly 10 advances at linear velocity v between 400 and 700 meters per minute (e.g., between about 500 and 600 meters per minute).

As the optical-fiber assembly 10 passes near (e.g., beneath) a dispenser unit 25 (or similar dispensing device), bonding material (e.g., a curable adhesive) is applied to the optical-fiber assembly 10 to adhesively bond adjacent optical fibers 11 in the optical-fiber assembly. For example, the bonding material may be dispensed as a continuous adhesive bead (or a plurality of discontinuous beads) via a dispensing nozzle 26 to a major surface of the optical-fiber assembly 10 (e.g., its upper planar surface). Typically, the dispenser 25 and/or the dispensing nozzle 26 apply bonding material to each optical fiber 11 in the optical-fiber assembly 10 to bond the optical-fibers 11 into an optical-fiber ribbon 1.

Exemplary process embodiments, described herein, include applying bonding material to the optical-fiber assembly (e.g., a major surface, such as its upper planar surface) to adhesively bond adjacent optical fibers in the optical-fiber assembly, wherein the dispenser repeatedly moves an amplitude $A_d$ measured crosswise to the longitudinal length of the optical-fiber assembly such that the dispenser's amplitude $A_d$ exceeds the optical-fiber assembly's width w (e.g., an "overshooting" technique). Thereafter, the optical-fiber assembly with an adhesive bead is passed through a curing station 28 for curing the bonding material (e.g., a curable adhesive, such as curable ultraviolet (UV) resins). See FIGS. 5-6.

In some exemplary process embodiments, the dispenser 25 and/or the dispensing nozzle 26 (or other dispensing device) oscillate in a direction transverse to the longitudinal direction (i.e., in the width direction) of the optical-fiber assembly, and the optical-fiber assembly moves in the longitudinal direction, such as via a reel 29. The tip of the dispenser 25 (e.g., the dispensing nozzle 26) may oscillate (e.g., vibrate) in a transverse direction at a high frequency, such as between about 100 Hz and 200 Hz. In an exemplary process embodiment, the dispensing nozzle 26 may deliver liquid bonding material in fine droplets to the advancing optical-fiber assembly 10. Because of surface tension, the liquid bonding material—if provided in sufficient droplets at a sufficient frequency—will flow together to form adhesive beads (e.g., elongated beads).

In an exemplary process embodiment, the dispenser 25 and/or the dispensing nozzle 26 move crosswise substantially corresponding to the width w of the longitudinal optical-fiber assembly 10. In this way, the bonding material is applied as an adhesive bead across at least one major surface of the optical-fiber assembly (e.g., in a pattern on the upper planar surface substantially across the width of the optical-fiber assembly). As will be understood by those having ordinary skill in the art, providing an adhesive bead "substantially across the width" of the optical-fiber assembly bonds adjacent optical fibers to yield an optical-fiber ribbon (e.g., the adhesive deposition patterns extend to the outermost opposite optical fibers in the optical-fiber assembly).

In a related process embodiment, the dispenser 25 and/or the dispensing nozzle 26 move crosswise substantially corresponding to the lateral distance (w−2d) between the two outermost optical fibers. As will be understood by those having ordinary skill in the art, this lateral distance (w−2d) is the separation between the outermost grooves in the optical-fiber assembly (e.g., as defined by the respective interfaces of each outermost optical fiber and its respective adjacent optical fiber). See FIG. 5. As used herein, terms like "substantially corresponding to the width" and "substantially corresponding to the lateral distance" refer to the movement of a dispensing nozzle and/or the corresponding adhesive deposition patterns, which typically extend to the outermost opposite optical fibers in the optical-fiber assembly (e.g., opposite edge portions of the optical-fiber assembly).

Typically, the adhesive beads bonding adjacent optical fibers in the optical-fiber assembly form a regular pattern (continuous or discontinuous) across the width of the optical-fiber assembly, such as a zigzag-like pattern, a sawtooth-like pattern, or a sinusoidal-like pattern having a peak-to-valley amplitude substantially between (i) the lateral distance between the two outermost optical fibers (w−2d) and (ii) the width w of the optical-fiber assembly. (Some excess bonding material may be present outside one or both outermost optical fibers in the optical-fiber ribbon.) In some exemplary process embodiments, the dispensing nozzle may pause when positioned above grooves in the optical-fiber assembly to deposit bonding material as longitudinal, rectilinear adhesive beads within the respective grooves (e.g., grooves between contiguous optical fibers).

In process embodiments in which the dispenser 25 and/or the dispenser nozzle 26 move crosswise substantially corresponding to the (i) the lateral distance between the two outermost optical fibers (w−2d) and (ii) the width w of the optical-fiber assembly, the application of bonding material periodically or intermittently stops (e.g., while the longitudinal optical-fiber assembly continues to advance at linear velocity v) to achieve recurring adhesive-free gaps in which no bonding material is present across the width w of the optical-fiber assembly for a portion of its longitudinal length. In this way, the intermittent application of bonding material to the optical-fiber assembly achieves exemplary optical-fiber ribbons, such as those depicted in FIGS. 1-4.

In an alternative process embodiment, the dispenser 25 and/or the dispensing nozzle 26 move crosswise but "overshoot" the width w of the longitudinal optical-fiber assembly 10. That is, the dispenser 25 and/or dispensing nozzle 26 move an amplitude $A_d$ measured crosswise to the longitudinal length of the optical-fiber assembly 10, wherein the dispenser's amplitude $A_d$ exceeds the optical-fiber assembly's width w. In this way, the bonding material is applied as an adhesive bead 16 across at least one major surface of the optical-fiber assembly (e.g., in a pattern on the upper planar surface substantially across the width of the optical-fiber assembly) to bond adjacent optical fibers. The dispenser 25 and/or the dispensing nozzle 26 apply bonding material to each optical fiber 11 in the optical-fiber assembly 10 to yield an optical-fiber ribbon in which the adhesive deposition patterns extend to the outermost opposite optical fibers in the optical-fiber assembly. For example, in many process embodiments, the dispenser unit 25 repeatedly moves across the width w of the optical-fiber assembly 10 beyond both a first outermost optical fiber 11a in the optical-fiber assembly and an opposite second outermost optical fiber 11b in the optical-fiber assembly to apply bonding material to each optical fiber 11 in the optical-fiber assembly 10. More generally, the dispenser 25 and/or the dispensing nozzle 26 may overshoot both edges of the optical-fiber assembly (e.g., the first outermost optical fiber 11a and the opposite second outermost optical fiber 11b in the optical-fiber assembly 10) or only one edge of the optical-fiber assembly (e.g., either the first outermost optical fiber 11a or the opposite second outermost optical fiber 11b in the optical-fiber assembly 10). See e.g., FIG. 5.

This "overshooting" technique can be advantageous because it can produce an optical-fiber ribbon having recurring adhesive-free gaps (e.g., areas in which essentially no bonding material is present across the width w of the optical-fiber assembly for a portion of its longitudinal length) while the bonding material is applied (e.g., continuously applied) to the optical-fiber assembly. More generally, the "overshooting" technique can yield adhesive beads that bond adjacent optical fibers in regular patterns (continuous or discontinuous) across the width of the optical-fiber assembly, such as a zigzag-like pattern, a sawtooth-like pattern, or a sinusoidal-like pattern having a peak-to-valley amplitude substantially between (i) the lateral distance between the two outermost optical fibers (w−2d) and (ii) the width w of the optical-fiber assembly. Continuous beads typically extend across the full width w of the optical-fiber assembly. (As noted, some excess bonding material may be present outside one or both outermost optical fibers in the optical-fiber ribbon.)

In one process embodiment, the dispenser 25 and/or dispensing nozzle 26 continuously reciprocate an amplitude $A_d$ across the width w of the optical-fiber assembly. This uninterrupted reciprocation can produce continuous adhesive beads (e.g., zigzag-like patterns or sinusoidal-like patterns) between the outermost optical fibers in the optical-fiber ribbon, such as depicted in FIGS. 1-2. See also FIGS. 7-8.

Figure 7:
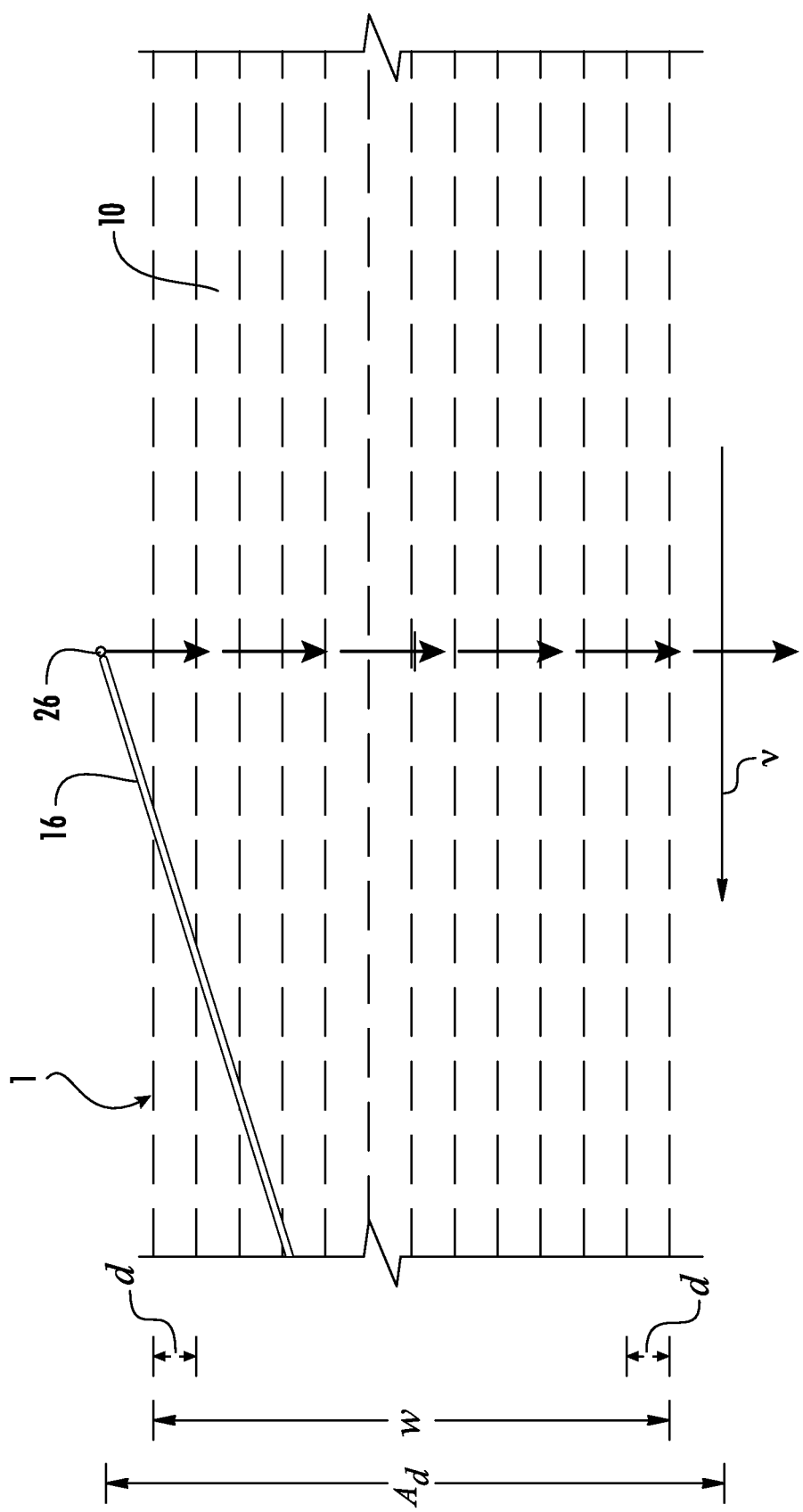
FIG. 7 is a top pictorial view depicting a portion of FIG. 6 in accordance with a first implementation.
Figure 8:
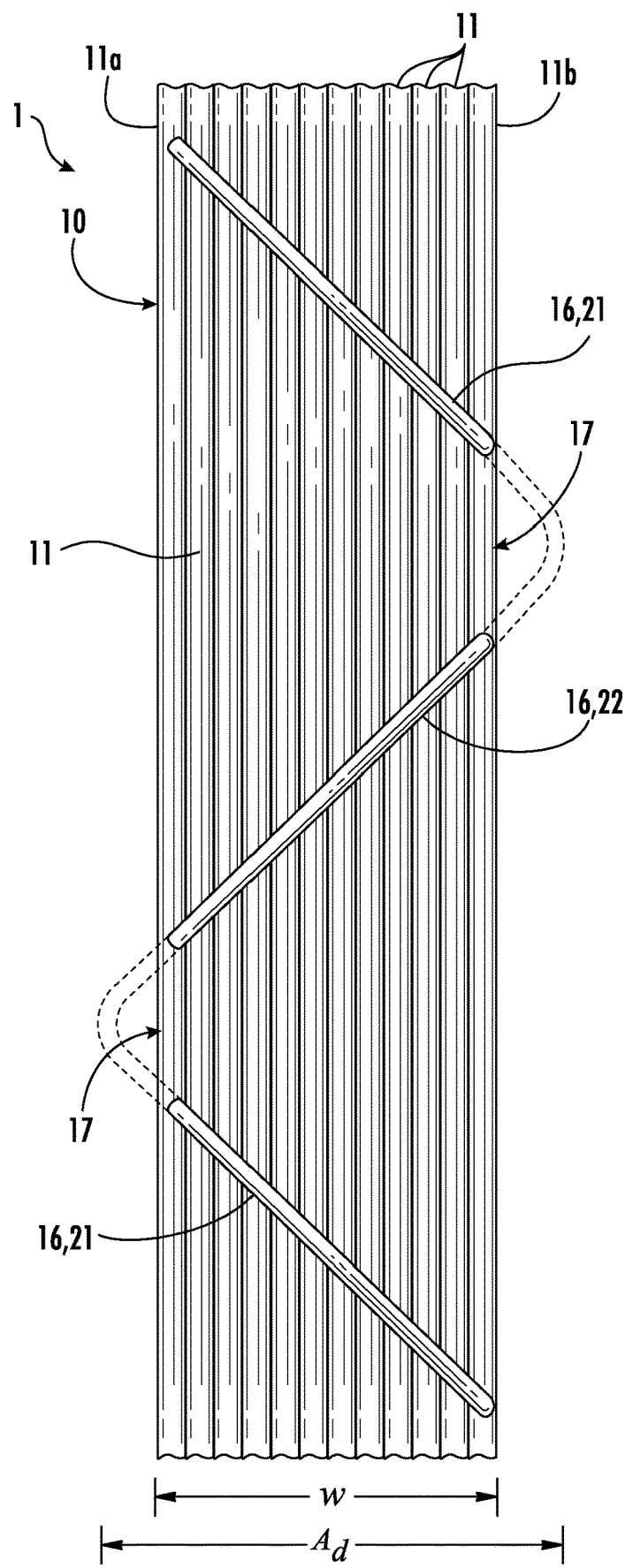
FIG. 8 is a top pictorial view of a section of an optical-fiber ribbon, wherein dashed lines schematically depict portions of bonding material supplied by the system of FIG. 6.

By way of illustration, FIG. 7 depicts a process embodiment in which the dispensing nozzle 26 linearly reciprocates across the optical-fiber assembly (e.g., moves side-to-side crosswise to the longitudinal length of the optical-fiber assembly with an amplitude $A_d$ exceeding the optical-fiber assembly's width w). This kind of "overshooting" reciprocation can yield an optical-fiber ribbon 1, such as schematically depicted in FIG. 8, having recurring adhesive-free gaps in which no bonding material is present across the width w of the optical-fiber assembly for a portion of its longitudinal length.

Figure 9:
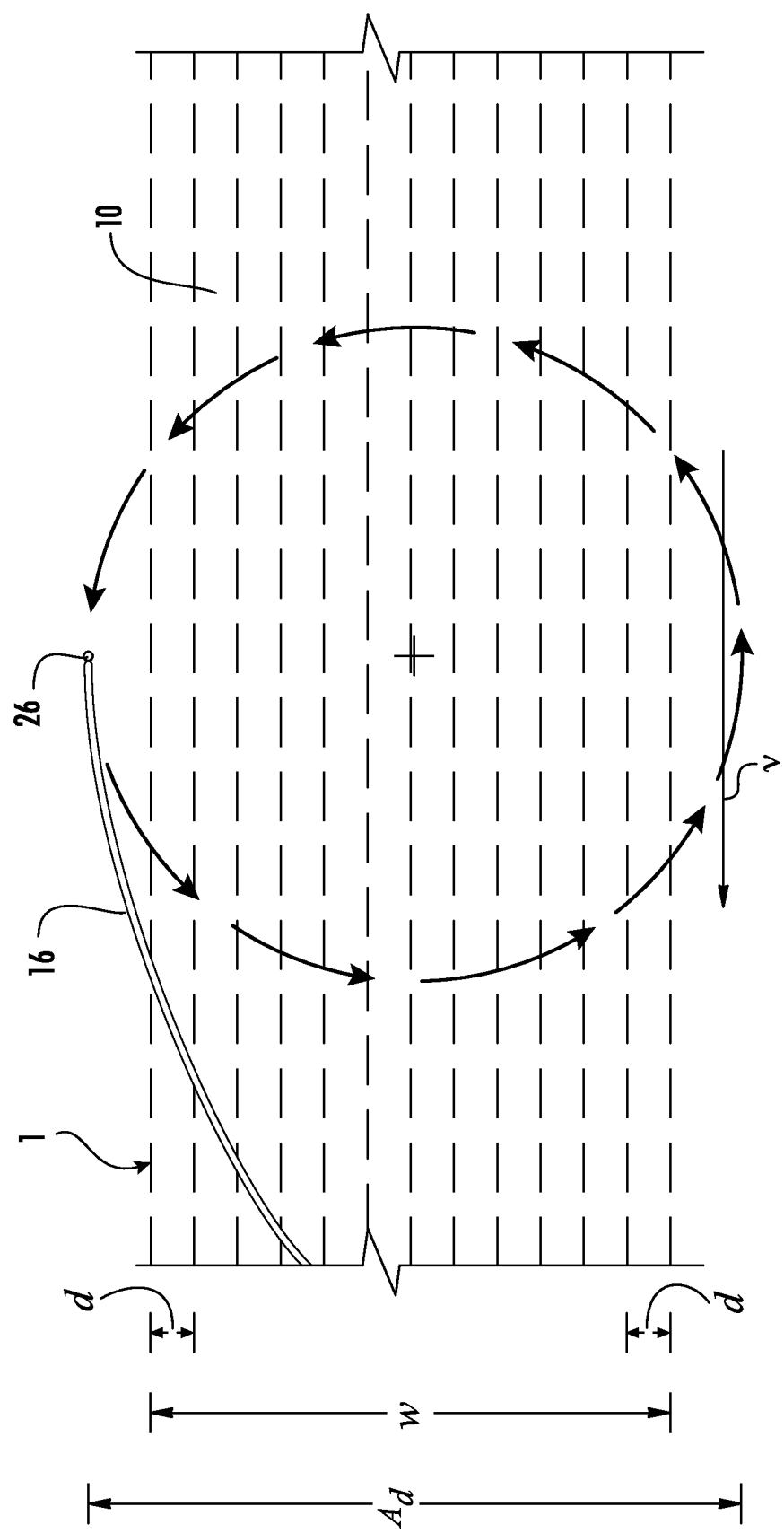
FIG. 9 is a top pictorial view depicting a portion of FIG. 6 in accordance with a second implementation.

FIG. 9 depicts an alternative process embodiment in which the dispensing nozzle 26 (or other dispensing device) revolves around a central axis at a cyclical frequency r (e.g., moves in a circular or elliptical motion over the optical-fiber assembly 10 with an amplitude $A_d$ exceeding the optical-fiber assembly's width w). In a related process embodiment, the dispensing nozzle 26 revolves around a central axis that is centrally positioned to substantially intersect the optical-fiber assembly's midline (w/2) (e.g., via a continuous or intermittent dispenser movement) to apply bonding material to each optical fiber in the optical-fiber assembly (e.g., while overshooting both edges of the optical-fiber assembly). For example, the deposited adhesive bead 16 across the width of the optical-fiber assembly may have a distorted sinusoidal pattern repeatedly forming (i) peaks at one edge portion of the optical-fiber assembly and (ii) valleys at an opposite edge portion of the optical-fiber assembly. Typically, these distorted sinusoidal peaks and distorted sinusoidal valleys have different respective shapes.

In related process embodiments, the dispenser 25 and/or the dispensing nozzle 26 (or other dispensing device) revolve in a plane parallel to a planar optical-fiber assembly 10. This has been observed to promote faster line speeds during the manufacturing of a continuously or intermittently bonded optical-fiber ribbon 1, such as an optical-fiber ribbon with a distorted sinusoidal pattern of bonding material. In this regard, an exemplary dispensing nozzle 26 is made of a capillary tube at the center of a metallic sleeve that is revolving in a substantially circular orbit via a servomotor (e.g., using belt-pulley system). Such a configuration reduces undesirable vibrations, which can be caused by the linear motion of a conventional reciprocating crank shaft as typically used with reciprocating nozzles, and avoids overlapping and/or uneven distribution of bonding material, which can occur using a conventional reciprocating crank shaft. Indeed, it has been observed that the use of a revolving nozzle helps to achieve linear velocities v between 400 and 700 meters per minute, which is about 4-5 times greater than is possible with a conventional reciprocating-crank-shaft system. For example, the linear velocity v of the optical-fiber assembly and the cyclical frequency r of the dispensing nozzle 26 can be controlled to achieve a pitch p (e.g., v/r) of at least about 50 millimeters, such as between 50 millimeters and 400 millimeters (e.g., between about 75 and 300 millimeters, such as 100-200 millimeters or 120-175 millimeters, for a 12-optical-fiber ribbon). As noted, exemplary optical-fiber ribbons may have a pitch p between about 10w and 150w as normalized to the width w of the optical-fiber ribbon 1 (e.g., about 30w-65w, such as about 35w-50w or 40w-60w, for an exemplary sinusoidal-like deposition pattern of adhesive).

In another exemplary process embodiment, the dispenser 25 and/or dispensing nozzle 26 reciprocate an amplitude $A_d$ in intermittent steps across the width w of the optical-fiber assembly (e.g., via linear reciprocation or revolution around a central axis). For example, the dispensing nozzle may pause when positioned above grooves in the optical-fiber assembly to deposit bonding material as longitudinal, rectilinear adhesive beads within the respective grooves (e.g., grooves between contiguous optical fibers). Such intermittent reciprocation can produce rectilinear adhesive beads (e.g., rectilinear-bead patterns) between the outermost optical fibers in the optical-fiber assembly, such as depicted in FIGS. 3-4.

By way of background and illustration, the respective cross-sectional areas of exemplary adhesive beads can be approximated by 125-micron equilateral-triangle sides for 250-micron optical fibers (e.g., about 0.0068 $mm^2$) and by 100-micron equilateral-triangle sides for 200-micron optical fibers (e.g., about 0.0043 $mm^2$). With a +/−20 percent estimation of bead dimensions, the respective ranges for cross-sectional areas of the beads can be approximated by 100-micron to 150-micron equilateral-triangle sides for the 250-micron optical fibers (e.g., between about 0.0043 $mm^2$ and 0.0097 $mm^2$) and by 80-micron to 120-micron equilateral-triangle sides for the 200-micron optical fibers (e.g., between about 0.0028 $mm^2$ and 0.0062 $mm^2$).

In accordance with the foregoing, it is within the scope of the present disclosure to have either one substantially continuous adhesive bead or a series of discontinuous beads that secure (e.g., affix) the optical fibers within the optical-fiber ribbon. In an exemplary embodiment, the adhesive bead(s) are arranged on only one side of the optical-fiber assembly (i.e., a first side). For example, the bead(s) are arranged only on one major surface of the optical-fiber assembly, typically its upper surface (i.e., when the optical fibers are arranged in a ribbon-like manner rather than rolled up). As noted, the optical-fiber assembly can be viewed as a ribbon-like assembly defining an upper surface, a lower surface, and two side edges. The upper and lower surfaces (i.e., the respective major surfaces) are not completely flat, because they are formed of a substantially parallel arrangement of optical fibers. As such, the upper and lower surfaces have parallel longitudinal grooves between adjacent optical fibers. Those having ordinary skill in the art will understand the optical fibers may not be perfectly parallel but rather substantially parallel in practice.

As discussed, in exemplary optical-fiber ribbons according to the present invention, bonding material adhesively bonds adjacent optical fibers in an optical-fiber assembly. Two such optical-fiber ribbons may be aligned and joined using a mass-fusion splicing machine. For example, corresponding 12-fiber optical-fiber ribbons may be positioned in respective 12-fiber alignment chucks and, after heat stripping, cleaning, and cleaving, the two optical-fiber ribbons may be spliced at once (e.g., the corresponding optical fibers can be simultaneously butt-spliced end-to-end in the mass-fusion splicing machine).

The optical-fiber ribbon according to the present invention may be used to form optical-fiber-cable units and optical-fiber cables. An exemplary optical-fiber-cable unit has 24 ribbons of twelve optical fibers each. Such an optical-fiber-cable unit packs 288 optical fibers into a high optical-fiber density. Accordingly, in another inventive aspect, the present invention embraces an optical-fiber-cable unit including one or more optical-fiber ribbons (also according to the present invention) surrounded by a polymeric sheath. The present invention further embraces an optical-fiber cable including one or more of the optical-fiber ribbons or optical-fiber-cable units according to the present invention.

To supplement the present disclosure, this application incorporates entirely by reference the following commonly assigned patents, patent application publications, and patent applications: U.S. Pat. No. 7,623,747 for a Single Mode Optical Fiber; U.S. Pat. No. 7,889,960 for a Bend-Insensitive Single-Mode Optical Fiber; U.S. Pat. No. 8,145,025 for a Single-Mode Optical Fiber Having Reduced Bending Losses; U.S. Pat. No. 8,265,442 for a Microbend-Resistant Optical Fiber; U.S. Pat. No. 8,600,206 for a Reduced-Diameter Optical Fiber; U.S. Pat. No. 10,185,105 for a Flexible Optical-Fiber Ribbon; U.S. Pat. No. 10,782,495 for a Flexible Optical-Fiber Ribbon; International Application No. PCT/EP2017/067454 (filed Jul. 11, 2017, and published as International Publication No. WO 2019/011417 A1 and as U.S. Patent Application Publication No. US2020/0271879 A1); International Application No. PCT/EP2018/050898 (filed Jan. 15, 2018, and published as International Publication No. WO 2019/137627 A1); International Application No. PCT/EP2018/050899 (filed Jan. 15, 2018, and published as International Publication No. WO 2019/137628 A1); U.S. patent application Ser. No. 16/856,268 (filed Apr. 23, 2020, and published as U.S. Patent Application Publication No. US2020/0386961 A1);); and U.S. patent application Ser. No. 17/130,568 for an Optical-Fiber Ribbon with Spaced Optical-Fiber Units (concurrently filed Dec. 22, 2020).

Other variations of the disclosed embodiments can be understood and effected by those of ordinary skill in the art in practicing the present invention by studying the drawings, the disclosure, and the appended claims. In the claims, the word "comprising" does not exclude other elements or steps, and the indefinite article "a" or "an" does not exclude a plurality. Unless otherwise specified, numerical ranges are intended to include the endpoints.

It is within the scope of this disclosure for one or more of the terms "substantially," "about," "approximately," and/or the like, to qualify each adjective and adverb of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents:

The invention claimed is:

1. An optical-fiber ribbon, comprising:
(i) a plurality n of respectively adjacent optical fibers extending in a longitudinal direction and arranged in parallel to form an optical-fiber assembly having a width w extending crosswise to a longitudinal length of the optical-fiber assembly; and
(ii) bonding material on the optical-fiber assembly adhesively bonding adjacent optical fibers in the optical-fiber assembly, the bonding material repeatedly forming alternating first and second bonding-material patterns across the optical-fiber assembly for a portion of its longitudinal length, wherein, in the same direction along the longitudinal length of the optical-fiber assembly:
the first bonding-material patterns extend across the optical-fiber assembly from a first outermost optical fiber in the optical-fiber assembly to an opposite second outermost optical fiber in the optical-fiber assembly, and the second bonding-material patterns extend across the optical-fiber assembly from the second outermost optical fiber in the optical-fiber assembly to the opposite first outermost optical fiber in the optical-fiber assembly,
the alternating first and second bonding-material patterns have respective mean lengths $l_1$ and $l_2$ as measured along the longitudinal length of the optical-fiber assembly, and
the alternating first and second bonding-material patterns achieve recurring adhesive-free gaps in which no bonding material is present across the width w of the optical-fiber assembly for a portion of its longitudinal length, the adhesive-free gaps having a minimum length g as measured along the longitudinal length of the optical-fiber assembly, wherein $g \geq 8 \times (l_1 \div n)$ if $l_1 \leq l_2$ and $g \geq 8 \times (l_2 \div n)$ if $l_2 \leq l_1$.

2. The optical-fiber ribbon according to claim 1, wherein the alternating first and second bonding-material patterns achieve recurring adhesive-free gaps in which no bonding material is present across the width w of the optical-fiber assembly for a portion of its longitudinal length, the adhesive-free gaps having a minimum length g as measured along the longitudinal length of the optical-fiber assembly, wherein $g \geq 16 \times (l_1 \div n)$ if $l_1 \leq l_2$ and $g \geq 16 \times (l_2 \div n)$ if $l_2 \leq l_1$.

3. The optical-fiber ribbon according to claim 1, wherein:
the optical-fiber assembly comprises at least four adjacent optical fibers extending in a longitudinal direction and arranged in parallel, wherein $n \geq 4$; and
the alternating first and second bonding-material patterns achieve recurring adhesive-free gaps in which no bonding material is present across the width w of the optical-fiber assembly for a portion of its longitudinal length, the adhesive-free gaps having a minimum length g as measured along the longitudinal length of the optical-fiber assembly, wherein $g \geq 2 \times l_1$ if $l_1 \leq l_2$ and $g \geq 2 \times l_2$ if $l_2 \leq l_1$.

4. The optical-fiber ribbon according to claim 1, wherein:
the optical-fiber assembly comprises at least six adjacent optical fibers extending in a longitudinal direction and arranged in parallel, wherein $n \geq 6$; and
the alternating first and second bonding-material patterns achieve recurring adhesive-free gaps in which no bonding material is present across the width w of the optical-fiber assembly for a portion of its longitudinal length, the adhesive-free gaps having a minimum length g as measured along the longitudinal length of the optical-fiber assembly, wherein $g \geq (l_1 + l_2)$.

5. The optical-fiber ribbon according to claim 1, wherein the alternating first and second bonding-material patterns achieve recurring adhesive-free gaps in which no bonding material is present across the width w of the optical-fiber assembly for a portion of its longitudinal length, the adhesive-free gaps having a minimum length g as measured along the longitudinal length of the optical-fiber assembly, wherein $g \geq (l_1 + l_2) \times (n \div (n-2))$.

6. The optical-fiber ribbon according to claim 1, wherein, in the same direction along the longitudinal length of the optical-fiber assembly, the minimum length g of the adhesive-free gaps is a first adhesive-free gap distance $g_{1-2}$ between adjacent, spaced ends of successive first and second bonding-material patterns whereby $g = g_{1-2}$, wherein both the adjacent end of the first bonding-material pattern and the adjacent end of the second bonding-material pattern are located along the second outermost optical fiber in the optical-fiber assembly, wherein $g_{1-2} \geq 8 \times (l_1 + l_2) \div 2n$ as measured along the longitudinal length of the optical-fiber assembly.

7. The optical-fiber ribbon according to claim 6, wherein, in the same direction along the longitudinal length of the optical-fiber assembly, the successive first and second bonding-material patterns have opposite, adjacent ends located along the first outermost optical fiber in the optical-fiber assembly and are spaced apart by a separation distance $d_{1-2}$, wherein $d_{1-2} \approx g_{1-2} + l_1 + l_2$ as measured along the longitudinal length of the optical-fiber assembly.

8. The optical-fiber ribbon according to claim 1, wherein:
the mean length $l_1$ of the first bonding-material patterns is inclusively between 90 percent and 100 percent of the mean length of the $l_2$ of the second bonding-material patterns; or
the mean length $l_2$ of the second bonding-material patterns is inclusively between 90 percent and 100 percent of the mean length $l_1$ of the first bonding-material patterns.

9. The optical-fiber ribbon according to claim 1, wherein:
the mean length $l_1$ of the first bonding-material patterns is between 10 percent and 95 percent of the mean length $l_2$ of the second bonding-material patterns; or
the mean length $l_2$ of the second bonding-material patterns is between 10 percent and 95 percent of the mean length $l_1$ of the first bonding-material patterns.

10. The optical-fiber ribbon according to claim 1, wherein, along a longitudinal portion of the optical-fiber assembly, each of the first bonding-material patterns respectively comprises a continuous bead of bonding material.

11. The optical-fiber ribbon according to claim 10, wherein, along a longitudinal portion of the optical-fiber assembly, each of the second bonding-material patterns respectively comprises a continuous bead of bonding material.

12. The optical-fiber ribbon according to claim 1, wherein, for a portion of the optical-fiber assembly's longitudinal length, the alternating first and second bonding-material patterns that achieve recurring adhesive-free gaps having a minimum length g in which no bonding material is present across the width w of the optical-fiber assembly each respectively consists essentially of a continuous bead of bonding material.

13. The optical-fiber ribbon according to claim 1, wherein, along a longitudinal portion of the optical-fiber assembly, each of the first bonding-material patterns respectively comprises a plurality of successive rectilinear beads arranged lengthwise along the optical-fiber assembly, wherein the beads are configured to form elongated bonds between adjacent optical fibers in the optical-fiber assembly.

14. The optical-fiber ribbon according to claim 13, wherein, along a longitudinal portion of the optical-fiber assembly, each of the second bonding-material patterns respectively comprises a plurality of successive rectilinear beads arranged lengthwise along the optical-fiber assembly, wherein the beads are configured to form elongated bonds between adjacent optical fibers in the optical-fiber assembly.

15. The optical-fiber ribbon according to claim 1, wherein, for a portion of the optical-fiber assembly's longitudinal length, the alternating first and second bonding-material patterns that achieve recurring adhesive-free gaps having a minimum length g in which no bonding material is present across the width w of the optical-fiber assembly each respectively consists essentially of a plurality of successive rectilinear beads arranged lengthwise along the optical-fiber assembly, wherein the beads are configured to form elongated bonds between adjacent optical fibers in the optical-fiber assembly.

16. The optical-fiber ribbon according to claim 1, wherein, along the optical-fiber assembly for a portion of its longitudinal length, each first bonding-material pattern immediately follows a second bonding-material pattern, and each second bonding-material pattern immediately follows a first bonding-material pattern.

* * * * *

UNITED STATES PATENT AND TRADEMARK OFFICE
CERTIFICATE OF CORRECTION

PATENT NO. : 11,460,652 B2
APPLICATION NO. : 17/130589
DATED : October 4, 2022
INVENTOR(S) : Fallahmohammadi et al.

It is certified that error appears in the above-identified patent and that said Letters Patent is hereby corrected as shown below:

On the Title Page

Column 2, Item (74) delete Attorney, Agent, or Firm and insert: -- Additon, Pendleton & Witherspoon, P.A. --

In the Specification

Column 5, delete Line 6 and insert: -- $(l_1 \div n)$ if $l_1 \leq l_2$ and $g \geq 8 \times (l_2 \div n)$ if $l_2 \leq l_1$. Typically, each of the --

Column 7, delete Line 55 and insert: -- $l_2)$, such as $g > (l_1 + l_2)$. --

Column 7, delete Line 64 and insert: -- $g > (l_1 + l_2) \times (n \div (n-2))$. All things being equal, the adhesive- --

In the Claims

Claim 4, Column 17, delete Line 3 and insert: -- the optical-fiber assembly, wherein $g \geq (l_1 + l_2)$. --

Claim 5, Column 17, delete Line 11 and insert: -- wherein $g \geq (l_1 + l_2) \times (n \div (n-2))$. --

Claim 6, Column 17, delete Line 21 and insert: -- optical-fiber assembly, wherein $g_{1-2} \geq 8 \times ((l_1 + l_2) \div 2n)$ as mea- --

Signed and Sealed this
Twentieth Day of December, 2022

Katherine Kelly Vidal
*Director of the United States Patent and Trademark Office*